United States Patent
Sah et al.

(10) Patent No.: US 7,236,871 B2
(45) Date of Patent: Jun. 26, 2007

(54) ACCELERATION LIMITING FOR A VEHICLE

(75) Inventors: Jy-Jen F. Sah, West Bloomfield, MI (US); Todd M. Steinmetz, Indianapolis, IN (US); Tung-Ming Hsieh, Carmel, IN (US); Larry T. Nitz, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 100 days.

(21) Appl. No.: 10/846,014

(22) Filed: May 14, 2004

(65) Prior Publication Data

US 2005/0256627 A1 Nov. 17, 2005

(51) Int. Cl.
*G06F 19/00* (2006.01)

(52) U.S. Cl. .............. 701/70; 701/84; 701/79; 701/87; 701/93; 701/110; 477/107; 477/110; 477/115; 477/120

(58) Field of Classification Search ......... 701/70, 701/84, 51–54, 79, 58, 60, 61, 93, 87, 110, 701/65; 180/178, 65.3; 477/107, 110, 115, 477/120, 169, 904, 905; 303/141

See application file for complete search history.

(56) References Cited

U.S. PATENT DOCUMENTS

| | | | |
|---|---|---|---|
| 5,931,757 A * | 8/1999 | Schmidt ............... 475/2 |
| 6,295,500 B1 * | 9/2001 | Cullen et al. ......... 701/93 |
| 6,459,980 B1 * | 10/2002 | Tabata et al. ......... 701/70 |
| 6,679,807 B2 * | 1/2004 | Kato et al. ........... 477/107 |
| 6,691,013 B1 * | 2/2004 | Brown ................. 701/70 |
| 6,719,379 B2 * | 4/2004 | Crombrez ............ 303/152 |
| 6,792,344 B2 * | 9/2004 | Minowa et al. ....... 701/96 |
| 2001/0016795 A1 * | 8/2001 | Bellinger ............. 701/53 |
| 2002/0107106 A1 * | 8/2002 | Kato et al. ........... 477/110 |

* cited by examiner

*Primary Examiner*—Thomas Black
*Assistant Examiner*—Marie A Weiskopf
(74) *Attorney, Agent, or Firm*—Dan L. Thompson

(57) ABSTRACT

A method and apparatus to control acceleration of a vehicle equipped with an electrically variable transmission and including a regenerative braking system, each are operably connected to a vehicle driveline. The method and apparatus include determining which one of a preselected shift selector position for the transmission is commanded, and determining operator demand for acceleration, using inputs from throttle pedal and brake pedal. Vehicle acceleration is measured, and magnitude of commanded torque transferred from the electrically variable transmission and the regenerative braking system to the vehicle driveline is controlled based upon the commanded preselected shift selector position, the operator demand for acceleration, and the measured vehicle acceleration.

5 Claims, 3 Drawing Sheets

ACCELERATION LIMITING FOR A VEHICLE

TECHNICAL FIELD

This invention pertains generally to control of a powertrain, and more specifically to powertrain control effecting vehicular acceleration and deceleration objectives.

BACKGROUND OF THE INVENTION

A vehicle operator typically controls acceleration of a vehicle by preselecting transmission shift characteristics, such as by selecting available gear ranges, e.g., FORWARD (F), 3-2-1, and actuating accelerator and brake pedals. Vehicle acceleration is also significantly dependent upon factors including vehicle mass, vehicle load, gradient of the road surface, and others. The rate of acceleration of the vehicle during acceleration and deceleration events is affected by vehicle load, particularly in mass transit, over-road commercial and heavy duty agricultural and construction applications wherein vehicle load may vary over a wide range. For example, a lightly loaded vehicle will exhibit substantially more acceleration than will a fully loaded vehicle for a given throttle pedal depression. Similarly, a lightly loaded vehicle will exhibit substantially more deceleration than will a fully loaded vehicle for a given brake pedal effort. Variations in acceleration and deceleration may affect passenger comfort in mass transit applications. Variations in acceleration and deceleration may affect load stability and shifting in commercial and heavy duty agricultural and construction applications. Variations in acceleration and deceleration may affect vehicle stability in all such applications. This presents operator challenges in that he must constantly be aware of the vehicle loading and road grade factors in an attempt to modulate throttle pedal and brake effort to achieve acceptable acceleration and deceleration.

Furthermore, whereas internal combustion engines provide peak torque relatively high in their operating speed ranges, electric motors provide peak torque in the low end of their speed range. Hybrid powertrains employing electric motors are well known for their low speed torque capabilities. This translates into significant available vehicle launch torque as well as significant available regenerative braking torque. When viewed in light of the undesirability of vehicle thrust variation, the significant low speed torque capabilities of hybrid powertrains presents additional challenges to achieving passenger comfort, load stability and vehicle stability.

What is needed is a method and apparatus to limit acceleration and deceleration of a vehicle to optimize passenger comfort, to minimize effect upon a vehicle load, and improve vehicle stability regardless of variations in acceleration and deceleration affecting factors such as vehicle load and road gradient.

SUMMARY OF THE INVENTION

The present invention provides an improvement over a conventional powertrain control system which typically provides a constant amount of output torque in accordance with an operator demand. The improvement includes a method and apparatus to control acceleration and deceleration of the vehicle. In accordance with the present invention, vehicular acceleration is controlled to provide a more consistent and predictable vehicle response. A method of such control includes monitoring vehicular acceleration and closed-loop limiting vehicle output torque as a function of a predetermined acceleration limit and vehicular acceleration. Preferably, closed-loop limiting is effective only when vehicle acceleration exceeds a predetermined value. Advantageously, the present invention is effective to control accelerations and decelerations of the vehicle and is adapted to various effective gear ratios of the vehicle. These and other aspects of the invention will become apparent to those skilled in the art upon reading and understanding the following detailed description of the embodiments.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
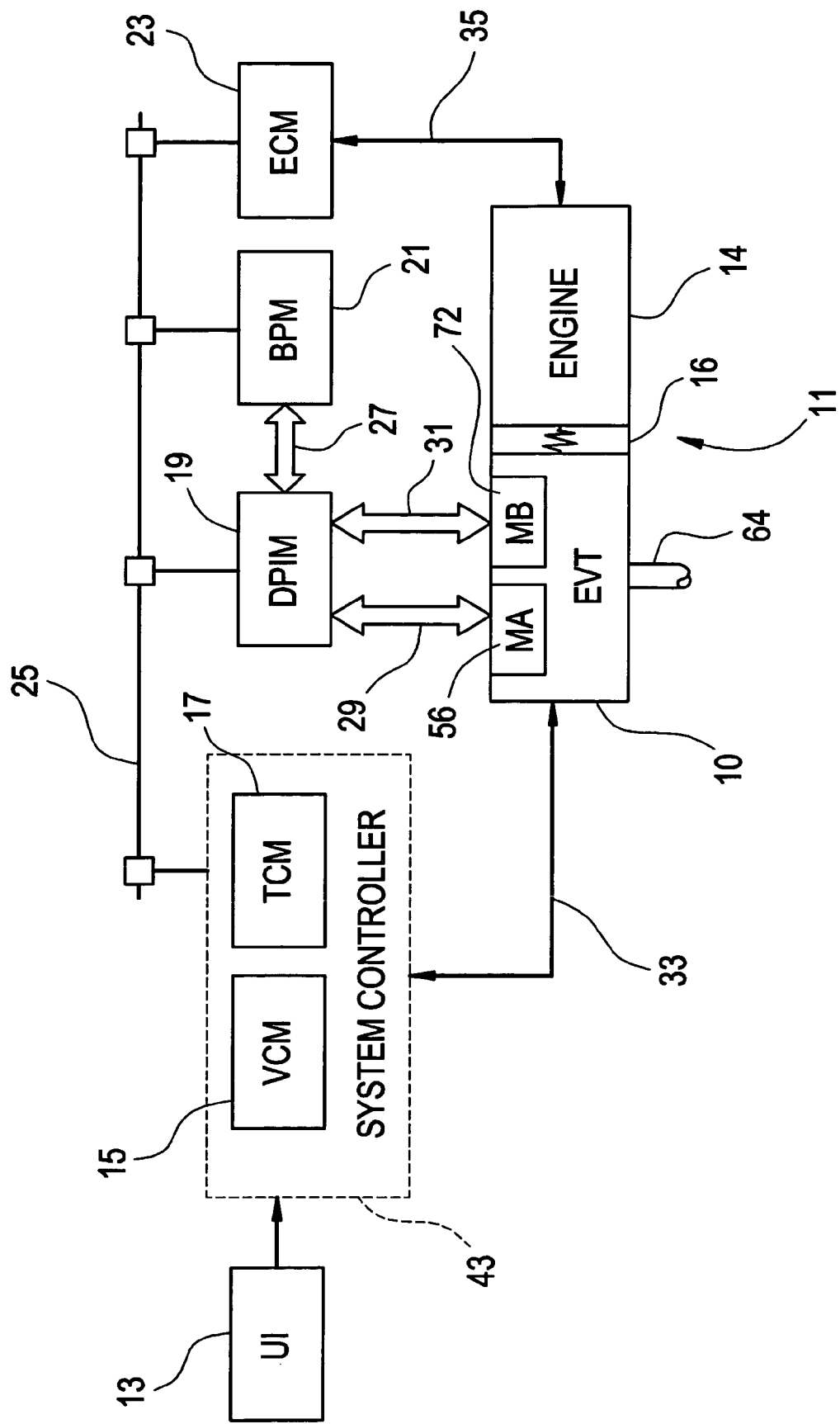
FIG. 1 is a schematic diagram of an exemplary powertrain system for implementing the present invention.
Figure 2:
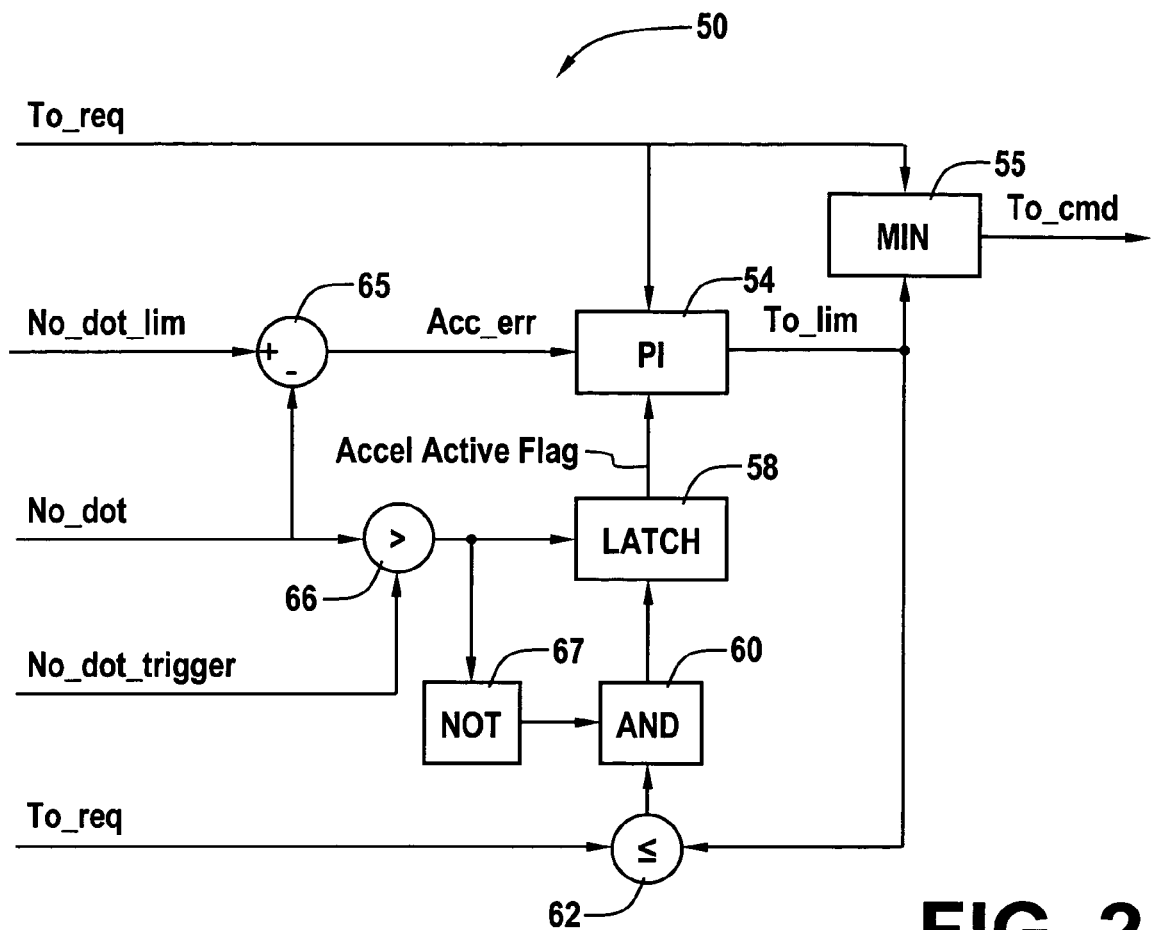
FIG. 2 is a schematic control diagram in accordance with a preferred embodiment of the present invention.

Referring now to the drawings, wherein the showings are for the purpose of illustrating the invention only and not for the purpose of limiting the same, FIG. 1 shows a schematic mechanization of an exemplary system utilized in accordance with an embodiment of the present invention. The exemplary system preferably includes a powertrain system 11 with an engine 14 and electrically variable transmission (EVT) 10.

The EVT 10 preferably comprises a multi-mode, compound-split, electrically variable transmission comprising one or more planetary gearsets and selective coupling paths in accordance with application and release of various torque transfer devices. The EVT 10 is operably connected to the engine 14 by an input member with an associated transient torque damper 16 interposed therebetween. The transient torque damper may incorporate, or be employed in conjunction with, a torque transfer device (not shown) to permit selective engagement of the engine 14 with the EVT 10. EVT 10 further includes a pair of electric motors MA 56 and MB 72 and an output shaft 64 that is operably connected to a driveline of the vehicle (not shown). The vehicle driveline may include such common driveline components as differential gearsets, propshafts, universal joints, final drive gearsets, wheels and tires. The electric motors receive electric power from and provide electric power to an energy storage system which may include one or more batteries in a battery pack module (BPM) 21 or any appropriate energy storage means capable of bidirectional electrical energy flow. Engine, driveline and motor torques may be in either direction. That is to say, each is capable of bidirectional torque contributions to the powertrain. The system further includes a dual power inverter module (DPIM) 19, an engine control module (ECM) 23, a system controller 43, and a controller area network (CAN) bus 25.

In the embodiment depicted, the engine 14 may be an internal combustion engine, preferably a compression-ignition engine, electronically controlled by ECM 23. ECM 23 is a conventional microprocessor-based engine controller comprising such common elements as microprocessor, read only memory ROM, random access memory RAM, electrically programmable read only memory (EPROM), high speed clock, analog to digital (A/D) and digital to analog (D/A) circuitry, and input/output circuitry and devices (I/O) and appropriate signal conditioning and buffer circuitry, as is known to one skilled in the art. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed, turbo pressure, and ambient air temperature and pressure. Various actuators that are typically controlled by the ECM 23 include fuel injectors, fan controllers, engine preheaters including glow plugs and grid-type intake air heaters. ECM 23 preferably provides for well-known torque-based controls for engine 14 in response to an engine torque command (Te_cmd) provided by system controller 43, as will be described in more detail hereinafter. Such engine electronics, controls and quantities are generally well known to those skilled in the art and further detailed exposition thereof is not required herein.

The DPIM 19 includes a pair of power inverters and respective motor controllers configured to receive motor control commands and control inverter states therefrom, for providing motor drive or regeneration functionality. The first motor MA 56 and a second motor MB 72 preferably comprise three-phase AC machines. Therefore, power inverters employed by the DPIM 19 preferably comprise complementary three-phase power electronic devices, as are known to one skilled in the art. The first motor MA 56 and the second motor MB 72 are connected to the DPIM 19 via high voltage phase lines 29 and 31. Individual motor speed signals Na and Nb for MA 56 and MB 72, respectively, are also derived by the DPIM 19 from the motor phase information or conventional rotation sensors. Such motors, electronics, controls and quantities are generally well known to those skilled in the art and further detailed exposition thereof is not required herein.

The DPIM 19 connects to the BPM 21 via high voltage direct current (DC) lines 27, allowing communication of substantial quantities of electrical energy therebetween. Electrical energy in the form of electrical current is transferable between the BPM 21 and the DPIM 19 in accordance with whether the BPM 21 is being charged or discharged.

The EVT 10 and DPIM 19 operate in a motoring control mode and in a regeneration control mode. When in the motoring control mode, the respective inverter receives current from the DC lines and provides AC current to the respective motor over high voltage phase lines 29 and 31. When in the regenerative mode, the respective inverter receives AC current from the motor over high voltage phase lines 29 and 31 and provides current to the DC lines 27. The net DC current provided to or from the inverters determines the charge or discharge operating mode of the BPM 21.

System controller 43 is a microprocessor-based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor-based controllers designated as vehicle control module (VCM) 15 and transmission control module (TCM) 17. VCM and TCM may provide, for example, a variety of control and diagnostic functions related to EVT and vehicle chassis including, for example, provision of engine torque commands, input speed control, and output torque control in coordination with regenerative braking, anti-lock braking and traction control.

The various modules described (i.e., system controller 43, DPIM 19, BPM 21, ECM 23) communicate via controller area network (CAN) bus 25. The CAN bus 25 effects communication between the various modules and controllers of control parameters and commands. The communication protocol utilized is application-specific, and not described in detail. For example, the preferred protocol for heavy duty applications is the Society of Automotive Engineers standard J1939. The CAN bus and appropriate protocols provide for robust messaging and multi-controller interfacing between the system controller 43, ECM 23, DPIM 19, BPM 21 and other controllers such as antilock brake and traction controllers.

Particularly with respect to EVT functionality, system controller 43 functions to directly acquire data from a variety of sensors and directly control a variety of actuators, respectively, of the EVT over a plurality of discrete lines. For simplicity, system controller 43 is shown generally in bidirectional interface with EVT via aggregate line 33. Of particular note, system controller 43 receives frequency signals from input and output member rotation sensors for processing into input speed (Ni) and output speed (No) signals for use in the control of EVT 10. Also illustrated is user interface (UI) block 13 which comprises inputs to system controller 43 such as vehicle throttle position, push button shift selector (PBSS) for available drive range selection, brake effort and fast idle requests, among others. Vehicle sensors, including rotation sensors, PBSS sensors, and position sensors are known to one skilled in the art, but are not shown in the detail of the drawings.

Generally, system controller 43 determines a commanded output torque (To_cmd) for use in the control of the powertrain. The determination of (To_cmd) is made based upon operator input factors such as throttle pedal position and brake pedal effort and vehicle dynamic conditions such as vehicle speed. Other operator input factors such as shift selector position and power take-off requests, other operational conditions such as temperatures, voltages, currents and member speeds may also influence the determination of output torque. System controller 43 also determines the constitution of the output torque in terms of engine and electric machine contributions and splits. This control is preferably accomplished in accordance with selected engine torque and speed operating points. Engine torque control is handled by the engine controller in accordance with a commanded engine torque (Te_cmd) determined by the system controller, and engine speed control is handled by a speed control directed through the control of electric motor torques. Preferred methods of determining engine speed and engine torque and controlling engine speed are disclosed in commonly assigned and co-pending U.S. Ser. Nos. 10/686,511, 10/686,508, 10/686,034, and 10/799,531, which are all incorporated herein by reference.

Powertrain control has the general objective of meeting the operator torque request. In accordance with the present invention, vehicle dynamic conditions of acceleration and deceleration rate further influence the determination of output torque. The powertrain controls are adapted in the present invention through provision of limited commanded output torque determined in accordance with the present invention.

The exemplary system described hereinabove includes the vehicle with engine 14 operably connected to the electrically variable transmission 10 which is operably connected to the vehicle driveline. The exemplary system is operable to control acceleration rate of the vehicle as described with reference to FIGS. 2, 3A, 3B, and 4.

As is described hereinafter, system controller 43 determines commanded output torque (To_cmd), based upon the vehicle acceleration (No_dot) and an acceleration limit (No_dot_lim). An additional basis for To_cmd determination is the preselected transmission shift selector position. System controller 43 is operable to determine acceleration limit (No_dot_lim), measure vehicle acceleration (No_dot), and, determine preselected transmission push button shift selector position (PBSS), as described previously. The system controller 43 controls the electrically variable transmission, including regenerative braking, based upon the commanded output torque (To_cmd). The method is preferably executed in the aforementioned system controller 43 in the form of a control system 50 (FIG. 2) with control logic, algorithms, and predetermined calibrations.

Inputs to the control system 50 include vehicle acceleration (No_dot), acceleration limit (No_dot_lim), operator output torque request (To_req), and an acceleration threshold pretrigger (No_dot_trigger). Output of the control system 50 comprises the commanded output torque (To_cmd). The commanded output torque (To_cmd) is used by the EVT control to establish output torque.

The control system 50 determines the vehicle acceleration (No_dot) by calculating the time-rate of change of output speed (No) of the EVT output shaft 64. The control system determines the acceleration limit (No_dot_lim) by monitoring the operator inputs as measured by user interface 13, including accelerator pedal position and brake effort (Brk_Op). The control system 50 determines the operator output torque request (To_req) by monitoring changes in the operator inputs as measured by user interface 13, including accelerator pedal position and brake effort (Brk_Op). The acceleration limit (No_dot_lim) and corresponding threshold pretrigger (No_dot_trigger) are, in the case of propulsion, predetermined calibration values that are determined during vehicle development and calibration, based upon factors unique to the vehicle, powertrain, and intended application. The acceleration threshold limit (No_dot_lim) and pretrigger (No_dot_trigger) are, in the case of coastdown and braking, values that are determined as functions of the shift selector position and brake effort.

Figure 3A:
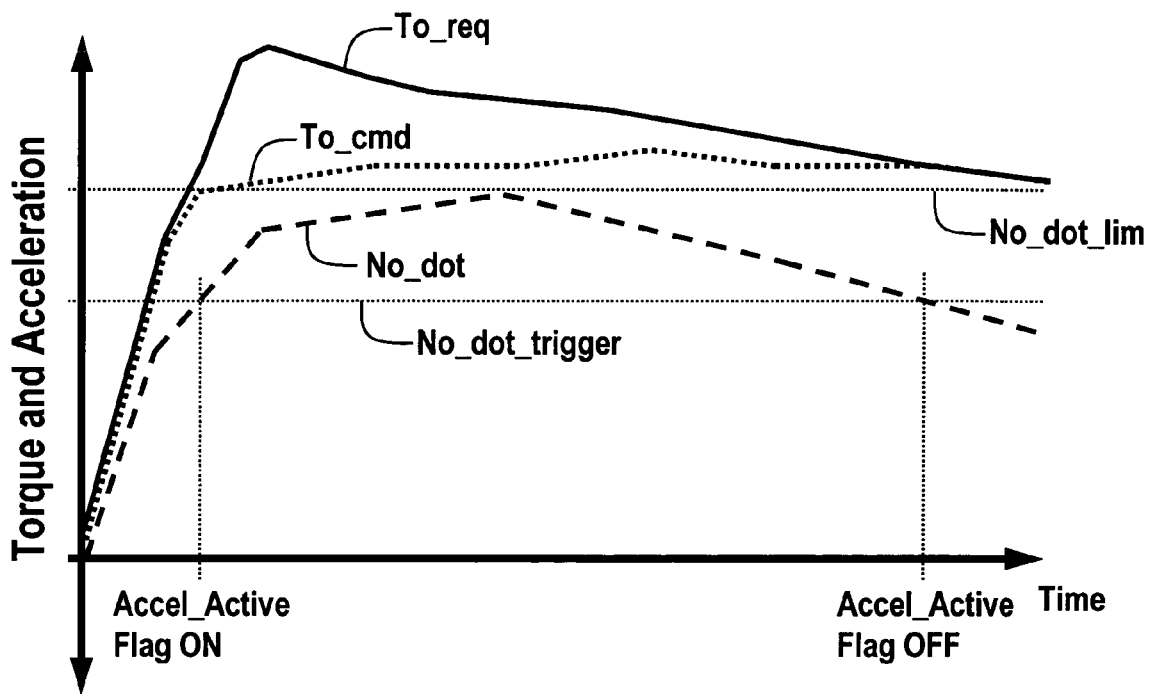
FIGS. 3A and 3B are response data curves demonstrative of the control performed in accordance with the present invention.

Referring again to FIG. 2, and in reference to FIGS. 3A and 3B and FIG. 4, operation of the control system will now be described, including positive acceleration, negative acceleration (or deceleration) without braking, i.e., coastdown, and negative acceleration (or deceleration) with braking.

To determine commanded output torque (To_cmd) when an operator commands a positive acceleration event, such as through depression of the accelerator pedal, the system determines the acceleration limit (No_dot_lim), the operator output torque request (To_req), and the vehicle acceleration (No_dot) as previously described. The vehicle acceleration (No_dot) is compared to the calibrated acceleration threshold pretrigger (No_dot_trigger) for positive acceleration (see FIG. 3A). When vehicle acceleration (No_dot) is greater than the calibrated acceleration threshold pretrigger (No_dot_trigger), the output of block 66 sets software flag Accel_Active via latch 58 thus indicating active acceleration control. An acceleration error term, Acc_err, is calculated, comprising the difference between the acceleration limit (No_dot_lim) and vehicle acceleration (No_dot). (See block 65.) The acceleration error term Acc_err is input to proportional-integral (PI) controller 54, and a limited output torque term, To_lim, is determined. The initial PI settings for use at the inception of the acceleration control are described herein below. The limited output torque term (To_lim) is compared to the operator output torque request (To_req), and the lesser of the terms is selected to be the commanded output torque (To_cmd) (see block 55). When vehicle acceleration (No_dot) is not greater than calibrated acceleration threshold pretrigger (No_dot_trigger), the PI controller 54 is recalibrated upon each control loop using a calibration that is slightly greater than the torque ramp rate from the system, and the PI output state is reset to the operator output torque request (To_req). Such recalibration effects a quick system response to the next invocation of the acceleration limit control without effecting any output torque limit when acceleration limit control is not active. PI controllers and their calibration are generally known to one skilled in the art, and are not described in detail. When vehicle acceleration (No_dot) is less than the calibrated acceleration threshold pretrigger (No_dot_trigger) (see blocks 66 and 67), and the operator output torque request (To_req) is less than or equal to the limited output torque term (To_lim) (see block 62) then output of block 60 resets the software flag Accel_Active via latch 58 thus providing the PI controller 54 a reset signal to effect the loop-to-loop recalibration and reset previously described.

To determine commanded output torque (To_cmd) when an operator commands a negative acceleration event, such as through release of the accelerator pedal alone or in combination with brake pedal effort, the system will determine the acceleration limit (No_dot_lim), the operator output torque request (To_req), and the vehicle acceleration (No_dot) as previously described.

Figure 4:
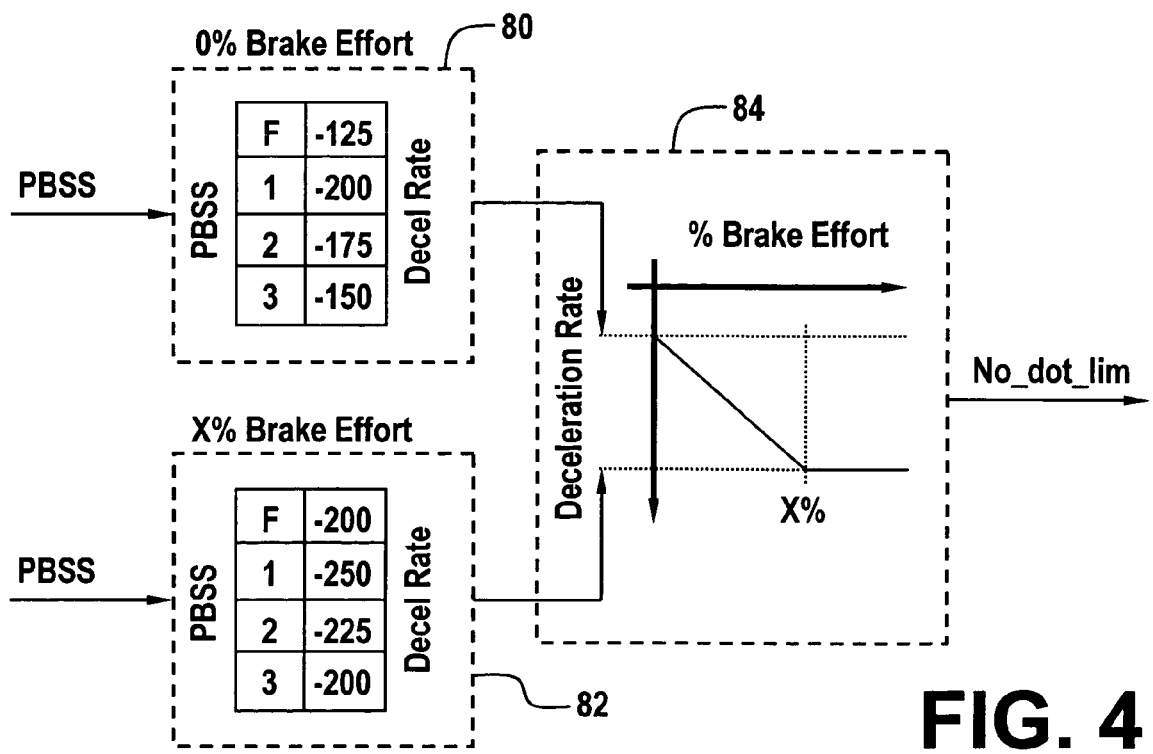
FIG. 4 is a diagram illustrating determination of a deceleration limit corresponding to various brake efforts in accordance with the present invention.

Referring now to FIG. 4, determining acceleration limit (No_dot_lim) when the operator commands a negative acceleration event (deceleration), based upon inputs from the user interface 13 including shift selector position, accelerator pedal depression and brake effort (Brk_Op) is shown. FIG. 4 depicts a process executed in the system controller 43. When the vehicle is decelerating without brake pedal effort, i.e., 0%, the acceleration limit (No_dot_lim) is determined using contents of table 80, which are preferably precalibrated. Thus, in this example, when push button shift selector (PBSS)=F, the corresponding acceleration limit (No_dot_lim)=−125 rpm/s; PBSS=1, acceleration limit (No_dot_lim)=−200 rpm/s; PBSS=2, acceleration limit (No_dot_lim)=−175 rpm/s; and PBSS=3, acceleration limit (No_dot_lim)=−150 rpm/s. When the vehicle is decelerating with brake pedal depression, acceleration limit (No_dot_lim) is determined by contents of tables 80 and 82 and interpolation therebetween as exhibited in graph 84. The acceleration limit (No_dot_lim) is determined by first determining the shift selector position from push button shift selector (PBSS), and interpolating between corresponding deceleration rates with and without braking, wherein interpolating is based upon brake effort (Brk_Op) expressed as a percentage of maximum braking effort. Thus, in this example, when the shift selector position is F, then the acceleration limit (No_dot_lim) is between −125 rpm/s (See 80, corresponding to F) and −200 rpm/s (See 82, corresponding to F), and is determined based upon the percentage of braking effort commanded by the operator (Brk_Op).

Figure 3B:
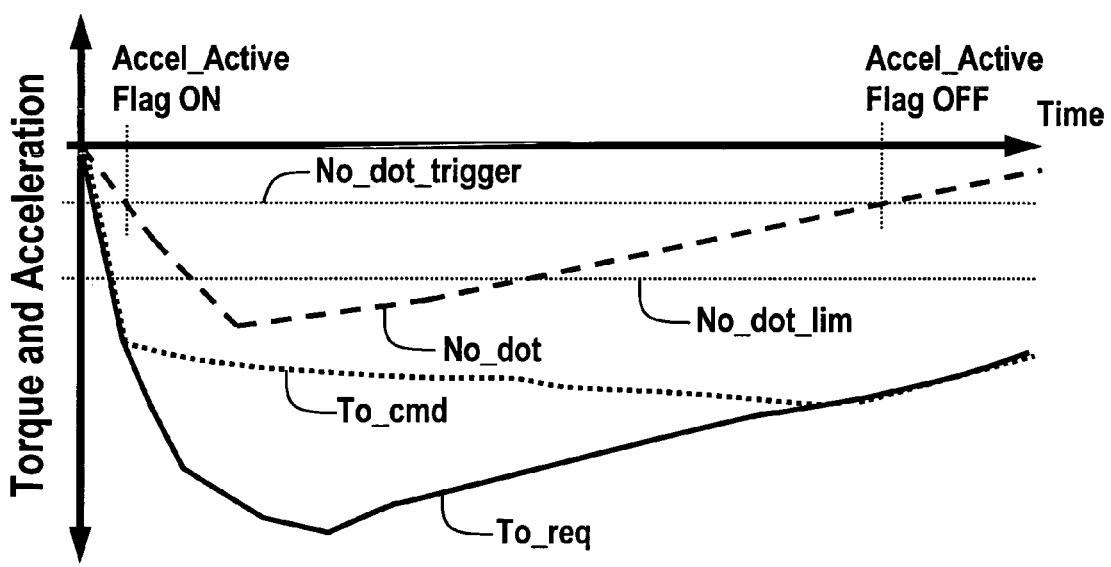

Referring again to FIG. 2, the vehicle acceleration (No_dot) is compared to the calibrated acceleration threshold pretrigger (No_dot_trigger) for negative acceleration (see FIG. 3B). When the magnitude of the vehicle acceleration (No_dot) is greater than the magnitude of the calibrated acceleration threshold pretrigger (No_dot_trigger), the output of block 66 sets software flag Accel_Active via latch 58 thus indicating active acceleration control. An acceleration error term, Acc_err, is calculated, comprising the difference between the acceleration limit (No_dot_lim) and vehicle acceleration (No_dot). (See block 65.) The acceleration error term, Acc_err, is calculated, comprising the difference between acceleration limit (No_dot_lim) (described hereinabove with reference to FIG. 4) and vehicle acceleration (No_dot). The acceleration error term Acc_err is input to proportional-integral (PI) controller 54, and limited output torque term (To_lim) is determined. The initial PI settings for use at the inception of the acceleration control are as described herein above with respect to acceleration control in during propulsion. The limited output torque term (To_lim) is compared to the operator output torque request (To_req), and the lesser of the terms (magnitudinally) is selected by the system controller to be the commanded output (To_cmd) (see block 55).

When the magnitude of vehicle acceleration (No_dot) is not greater than the magnitude of the calibrated acceleration threshold pretrigger (No_dot_trigger), the PI controller 54 is recalibrated upon each control loop using a calibration that is slightly greater than the torque ramp rate from the system, and the PI output state is reset to the operator output torque request (To_req). This is done for the same purpose as previously described with respect to the corresponding description of acceleration limit control during propulsion. PI controllers and their calibration are generally known to one skilled in the art, and are not described in detail. When the magnitude of vehicle acceleration (No_dot) is less than the magnitude of the calibrated acceleration threshold pretrigger (No_dot_trigger) (see blocks 66 and 67), and the magnitude of operator output torque request (To_req) is less than or equal to the magnitude of the limited output torque term (To_lim) (see block 62) then output of block 60 resets the software flag Accel_Active via block 58, thus providing the PI controller 54 a reset signal to effect the loop-to-loop recalibration and reset previously described.

The commanded output torque (To_cmd) is then used by the system controller 43 to control the EVT 10 and the engine 14.

The present invention has been described with respect to a particular exemplary hybrid powertrain arrangement. Those skilled in the art will recognize that other hybrid and conventional powertrain arrangements can be used in conjunction with the present invention. For example, conventional electro-hydraulically controlled, multi-speed transmissions can be used in conjunction with the present invention.

While the invention has been described by reference to certain preferred embodiments and implementations, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method to control vehicle output torque, comprising:
   determining an operator torque request and a vehicle acceleration rate;
   determining an acceleration error based upon the vehicle acceleration rate and an acceleration limit, the acceleration limit determined based upon a transmission shift selector position and an operator brake effort when the vehicle acceleration comprises a deceleration event;
   determining an output torque limit based upon the acceleration error; and,
   selectively controlling the vehicle output torque based upon one of the operator torque request and the output torque limit only when the vehicle acceleration rate is greater than a threshold.

2. The method of claim 1, further comprising selectively controlling the vehicle output torque to a minimum of the operator torque request and the output torque limit only when the vehicle acceleration rate is greater than the threshold.

3. The method of claim 2, further comprising selectively controlling the vehicle output torque based upon the operator torque request when the vehicle acceleration rate is less than the threshold.

4. The method of claim 3, wherein determining the operator torque request comprises resolving a throttle pedal input.

5. The method of claim 3, wherein determining the operator torque request comprises resolving a brake pedal input.

* * * * *